United States Patent
Nam et al.

(10) Patent No.: US 6,882,392 B2
(45) Date of Patent: Apr. 19, 2005

(54) METHOD FOR FABRICATING SMECTIC LIQUID CRYSTAL DISPLAY DEVICE

(75) Inventors: Mi Sook Nam, Kunpo-shi (KR); Hyun Ho Shin, Kunpo-shi (KR)

(73) Assignee: LG. Philips LCD Co., Ltd., Seoul (KR)

( * ) Notice: Subject to any disclaimer, the term of this patent is extended or adjusted under 35 U.S.C. 154(b) by 198 days.

(21) Appl. No.: 09/893,971

(22) Filed: Jun. 29, 2001

(65) Prior Publication Data
US 2002/0063831 A1 May 30, 2002

(30) Foreign Application Priority Data
Nov. 28, 2000 (KR) ........................................ 2000-71256

(51) Int. Cl.[7] ..................... G02F 1/1337; G03F 1/1339; C09K 19/02
(52) U.S. Cl. ....................... 349/124; 349/156; 349/123; 349/184
(58) Field of Search ................................. 349/156, 123, 349/124, 184; 428/1.5

(56) References Cited

U.S. PATENT DOCUMENTS

| | | | | | |
|---|---|---|---|---|---|
| 4,734,218 A | * | 3/1988 | Takuma et al. | ........... | 252/299.1 |
| 5,545,280 A | * | 8/1996 | Wenz | .......................... | 156/234 |
| 5,724,113 A | * | 3/1998 | Bryan-Brown et al. | ..... | 349/123 |
| 5,729,312 A | * | 3/1998 | Yamagishi et al. | ........... | 349/86 |
| 5,808,716 A | * | 9/1998 | Gass et al. | ................... | 349/124 |
| 5,880,803 A | * | 3/1999 | Tamai et al. | ................. | 349/156 |
| 5,978,061 A | * | 11/1999 | Miyazaki et al. | ........... | 349/155 |
| 6,063,829 A | * | 5/2000 | Endou et al. | ................ | 522/164 |

* cited by examiner

*Primary Examiner*—Huyen Ngo
(74) *Attorney, Agent, or Firm*—McKenna Long & Aldridge LLP

(57) ABSTRACT

A method for fabricating a smectic LCD using oriented films that are treated by light radiation. Furthermore, the bonding of the LCD substrates is performed using light and pressure. The method includes forming a first substrate, a second substrate, and locating spacers on the first substrate. Then, oriented films are formed on the first and second substrates. Those substrates are then disposed in a facing relationship. Light irradiation then performs an orientation treatment on the oriented films. That light irradiation also bonds the substrates together. A liquid crystal is then interposed between the first substrate and the second substrate.

35 Claims, 4 Drawing Sheets

METHOD FOR FABRICATING SMECTIC LIQUID CRYSTAL DISPLAY DEVICE

This application claims the benefit of Korean Patent Application No. 2000-71256 filed on Nov. 28, 2000, which is hereby incorporated by reference as if fully set forth herein.

BACKGROUND OF THE INVENTION

1. Field of the Invention

The present invention relates to a liquid crystal display device (LCD), and in particular, to a method for fabricating an LCD having photoalignment layers on the inner surfaces of two substrates that bond those substrates together using light radiation.

2. Discussion of the Related Art

Because of their size, weight, low power, and high image quality, LCDs are replacing cathode ray tubes (CRT) in many applications. In general, an LCD comprises a first substrate, a second substrate, and a liquid crystal between those substrates. There are many types of liquid crystals, including nematic, smectic, and cholesteric liquid crystals.

The liquid crystal types are classified according to their molecular array structure. The nematic liquid crystal has an irregular molecular array, but the molecules of the nematic phase have nearly parallel arrangement. The smectic liquid has a higher state of order than the nematic liquid crystal. That is, the smectic liquid crystal also has a layer structure, and molecules are randomly arrayed in each layer. The cholesteric liquid crystal has a rotational characteristic, like the smectic liquid crystal, such that the axes of the molecules are rotationally twisted.

A smectic liquid crystal has a switching speed several hundred times faster than a nematic liquid crystal. This speed advantage reduces screen image vagueness, making the smectic liquid crystal more suitable for large screen displays. Also, a smectic liquid crystal has a dual stability (or memory) that produces good image quality without flicker.

However, a smectic liquid crystal has drawbacks. They are vulnerable to external shocks and are highly degraded once their molecular orientations are broken. Such drawbacks are minimized by replacing the conventional ball spacers with shock resistant patterned spacers or adhesive spacers.

Methods for fabricating a smectic LCD will now be described. FIGS. 1A to 1D illustrate a first conventional process of fabricating a smectic LCD, while FIGS. 2A to 2D illustrate a second conventional process.

As shown in FIG. 1A, pixels are defined on a first substrate 11 by crossing gate lines and data lines. Thin film transistors are formed at the crossings. Pixel electrodes 13 that electrically connect to the thin film transistors are then formed. Thereafter, patterned spacers 15 are formed by photolithography. In practice, the patterned spacers 15 should be formed on the gate and data lines between the pixel electrodes.

The second substrate 12 includes a black matrix that prevents light leakage and that enhances a contrast ratio; red, green and blue color filters to produce colors; and a common electrode 14 that faces the pixel electrodes 13.

Referring now to FIG. 1B, the first substrate 11 and the second substrate 12 are coated with orientation films 16a and 16b. Then, as shown in FIG. 1C, the substrates are disposed facing each other. Those facing substrates are thermally pressed together to induce chemical bonding between the orientation films 16a and 16b and to bond the two substrates together. The shock resistance of the LCD is enhanced by the orientation films. In other words, external shocks are absorbed by the orientation films on the patterned spacers 15.

Eventually, the smectic LCD is completed by interposing a smectic liquid crystal 19 between the first substrate 11 and the second substrate 12 as shown in FIG. 1D.

Here, the liquid crystal orients in a predetermined direction due to the orientation films 16a and 16b, for which anisotropy have been provided. Depending on the application, a nematic or cholesteric liquid crystal can be used in place of the smectic liquid crystal.

According to another conventional technology, the smectic LCD can be fabricated as follows. As shown in FIG. 2A, crossing gate lines and data lines for transferring scan signals and data signals are arrayed on a first substrate 21. Thin film transistors are formed at the crossings. Pixel electrodes 23 that electrically connect to the thin film transistors are then formed. A first oriented film 26a is coated over the first substrate, include the thin film transistors and pixel electrodes 23.

A black matrix that corresponds to the gate and data lines, and to the thin film transistors, is formed on a second substrate 22. Color filters are formed between openings in the black matrix. A common electrode 24 is then formed over the second substrate 21, including over the black matrix and color filters. The common electrode 24 will face the pixel electrodes 23. A second oriented film 26b is then coated over the common electrode 24.

Then, the first and the second oriented films 26a and 26b are calcinated, and the surfaces thereof are rubbed by means of a rubbing roll surrounded by a cloth of a particular type. That rubbing induces an alignment direction to the oriented films 26a and 26b.

Referring now to FIG. 2B, ball spacers 27 are then dispersed over the first oriented film 26a of the first substrate 21. Additionally, adhesive spacers 28 are evenly dispersed over the first substrate 21.

The first substrate 11 and the second substrate 12 are then disposed facing each other as shown in FIG. 2C. The ball spacers 27, which are smaller than the adhesive spacers, are used to space the two substrates at a predetermined distance. The adhesive spacers bond the two substrates together and absorb shocks.

The adhesive spacers 28 are calcinated and completely bonded by thermally pressing the two substrates together as shown in FIG. 2D. An LCD is completed by interposing a liquid crystal 29 between the two substrates.

The liquid crystal 29 stably orients at a predetermined direction due to the anisotropy of the oriented films. Any one of the nematic, smectic or cholesteric liquid crystal may be used for the liquid crystal 29.

However, the conventional methods of fabricating a smectic LCD as described above have problems. The conventional LCD necessitates separate processes for calcinating the oriented films and calcinating the first and the second substrates for bonding. Furthermore, treatment of the oriented films by mechanical rubbing causes contamination due to dust, as well as damage of the thin film transistors due to static electricity. Both reduce the reliability of the LCD. Moreover, it is difficult to evenly orient the films by rubbing.

SUMMARY OF THE INVENTION

An object of the present invention is to provide a simplified method for fabricating a shock-resistant smectic LCD by simultaneously performing an orientation treatment and a bonding process using one light radiation.

To achieve the above object, there is provided a method for fabricating a smectic LCD, comprising the steps of: forming a first substrate and a second substrate; forming patterned spacers on the first substrate; forming oriented films on the first and second substrates; disposing the first and the second substrates so as to face each other; and bonding the oriented films on the first and the second substrates while performing an orientation treatment of the oriented films using one radiating light treatment; and interposing a liquid crystal between the first substrate and the second substrate.

The present invention simplifies the fabricating process by unifying the orientation treatment and the bonding process into one light irradiation treatment. The present invention also prevents the contamination of oriented films and the damage to thin film transistors that can be caused by rubbing.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

BRIEF DESCRIPTION OF THE DRAWINGS

The above and other objects, features and advantages of the present invention will become more apparent from the following detailed description when taken in conjunction with the accompanying drawings, in which.

DETAILED DESCRIPTION OF THE PREFERRED EMBODIMENTS

Preferred embodiments of the present invention will be described with reference to the accompanying drawings. In the following description, well-known functions or constructions are not described in detail since they might obscure the invention.

FIGS. 3A to 3D illustrate a process of fabricating a smectic LCD according to a first embodiment of the present invention, while FIGS. 4A to 4D illustrate a process of fabricating a smectic LCD according to a second embodiment of the present invention.

First Embodiment

Figure 1A:
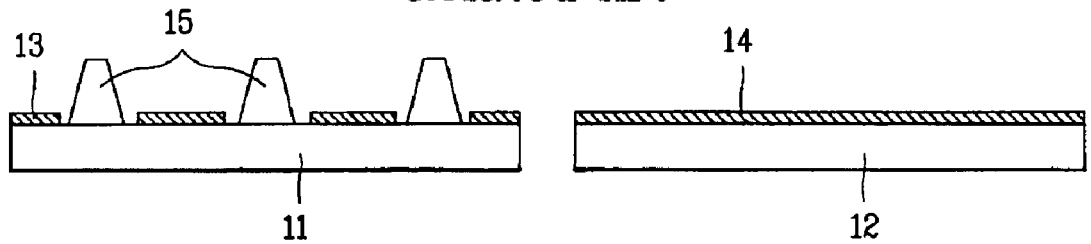
FIGS. 1A to 1D illustrate a process of fabricating a smectic LCD according to a conventional technology.
Figure 1B:
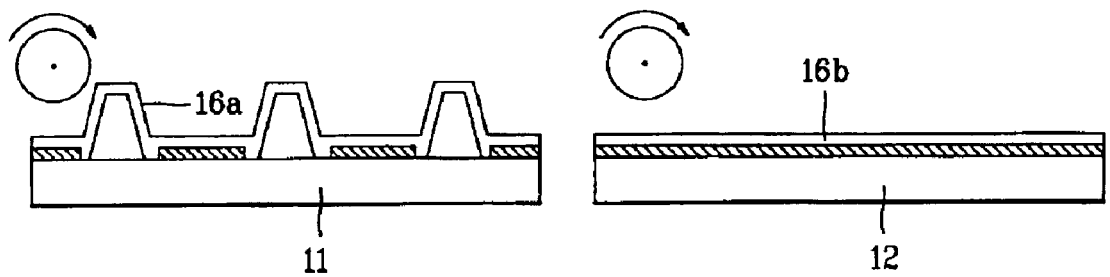
Figure 1C:
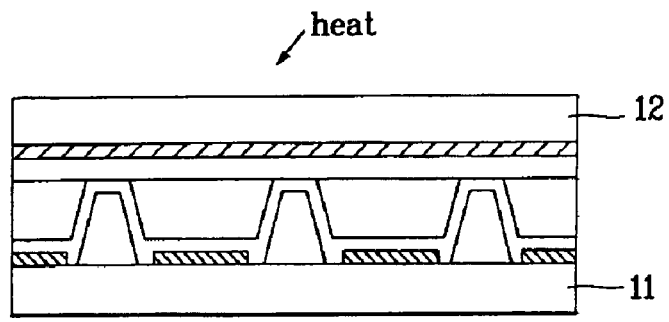
Figure 1D:
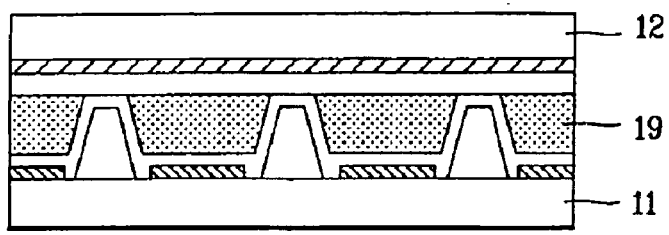
Figure 2A:
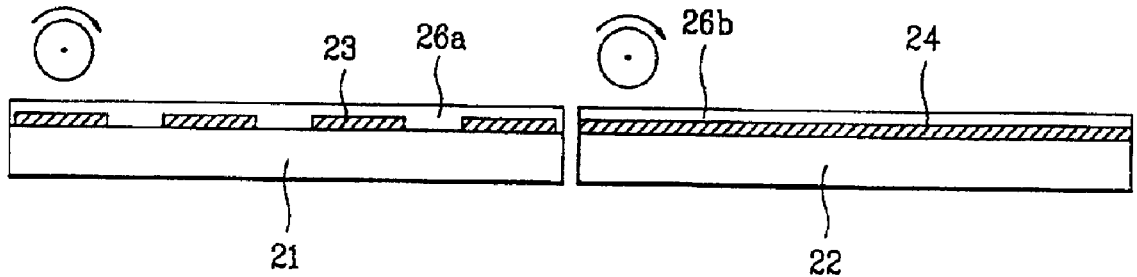
FIGS. 2A to 2D illustrate a process of fabricating a smectic LCD according to another conventional technology.
Figure 2B:
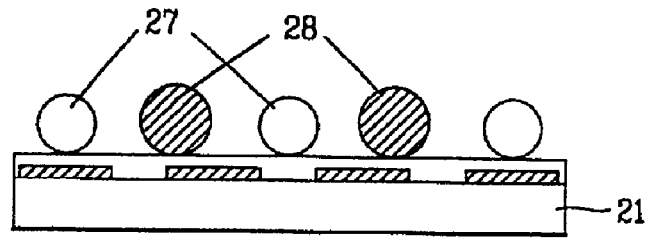
Figure 2C:
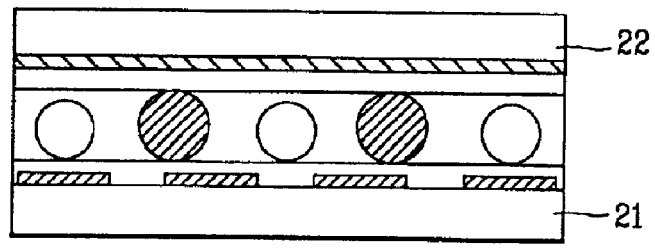
Figure 2D:
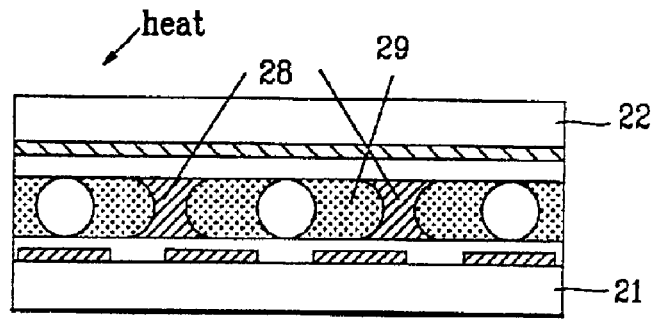
Figure 3A:
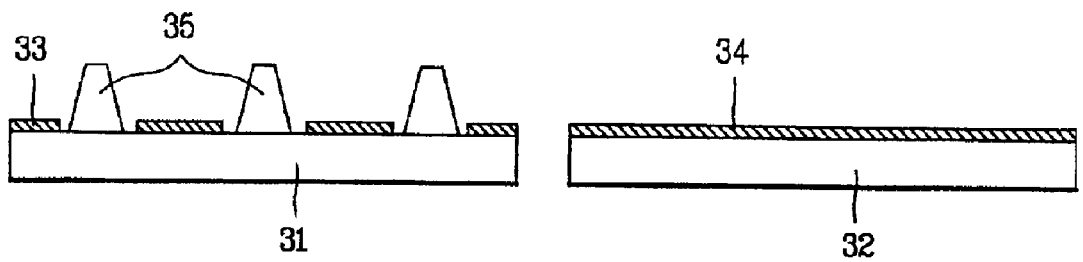
FIGS. 3A to 3D illustrate a process of fabricating a smectic LCD according to a first embodiment of the present invention.

Fabricating a smectic LCD according to the first embodiment of the present invention includes defining a pixel region comprised of crossing gate lines and data lines on a first substrate 31, reference FIG. 3A. Thin film transistors are then formed at the crossings.

Each thin film transistor comprises a gate electrode that is formed simultaneously with the gate lines, a silicon nitride gate insulating film, a semiconductor layer composed of a non-crystalline silicon, and source and drain electrodes that are formed simultaneously with the data lines. An ohmic contact layer comprised of an impurity doped non-crystalline silicon is formed between the semiconductor layer and the source and drain electrode.

Thereafter, pixel electrodes 33 are formed in each pixel region. Each pixel electrode is electrically connected to the drain electrode of a thin film transistor. A spacer material is then coated over the surface structures, including over the pixel electrode 33. The spacer material is then patterned using a photo etching process to produce patterned spacers 35 between the pixel electrodes and on the gate and data lines.

Meanwhile, a black matrix is formed on a second substrate 32. That black matrix corresponds to the gate and data lines and to the thin film transistors on the first substrate. Red, green, and blue color filters are then formed in openings in the black matrix. A common electrode 34 is then formed over the structures of the second substrate, including over the color filters.

The common electrode 34 is composed of a transparent conductive material such as ITO (as are the pixel electrodes 33).

Figure 3B:
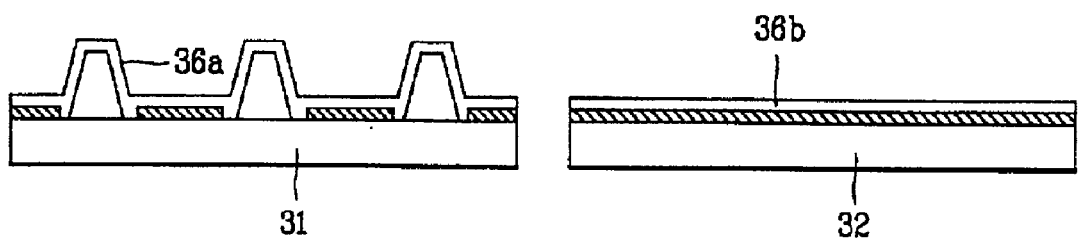

Referring now to FIG. 3B, a light oriented material having superior light characteristics is then rotationally coated and dried on the first substrate 31 and on the second substrate 32. The coated light oriented material forms a first oriented film 36A and a second oriented film 36B. Subsequently, the first oriented film 36A and the second oriented film 36B are calcinated.

Figure 3C:
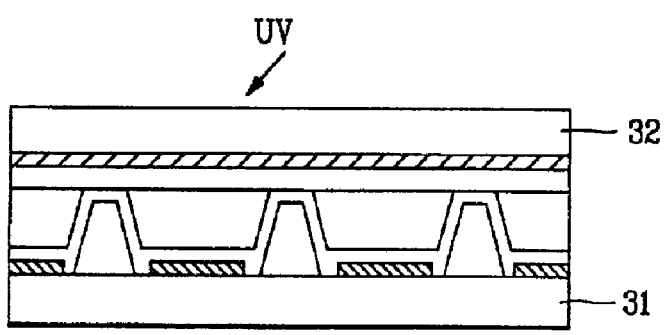

Referring now to FIG. 3C, the first substrate 31 and the second substrate 32 are then disposed so as to face each other. A polarized ultraviolet light (UV) is then radiated onto the first and the second substrates 31, 32 while those substrates are pressed together.

Radiation of the polarized light (UV) provides anisotropy to the first and the second oriented film, and also bonds the two substrates together through chemical bonding of the first and the second oriented films that are pressed by an upper portion of the patterned spacers 35.

The specific light radiating method that should be used will depend on the specific oriented films and liquid crystal. For example, light may be radiated vertically or obliquely. Elliptically polarized light or lineally polarized light may be used. The light may be radiated once, or a plurality of times.

Figure 3D:
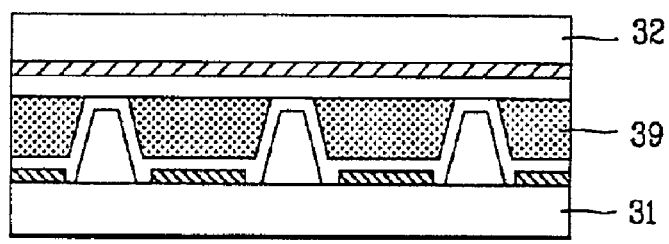

Eventually, a smectic LCD is completed by interposing a smectic liquid crystal 39 between the bonded first substrate 31 and second substrate 32, as shown in FIG. 3D.

The liquid crystal is stably oriented in a predetermined direction due to the anisotropy of the oriented film. Nematic or cholesteric liquid crystals can also be used.

In an LCD formed as above, the patterned spacers 35 are fixed even if the spacing between the first substrate and the second substrate increases in subsequent processing steps. Thus a faulty LCD caused by flexibility of the spacers can be avoided.

Figure 4A:
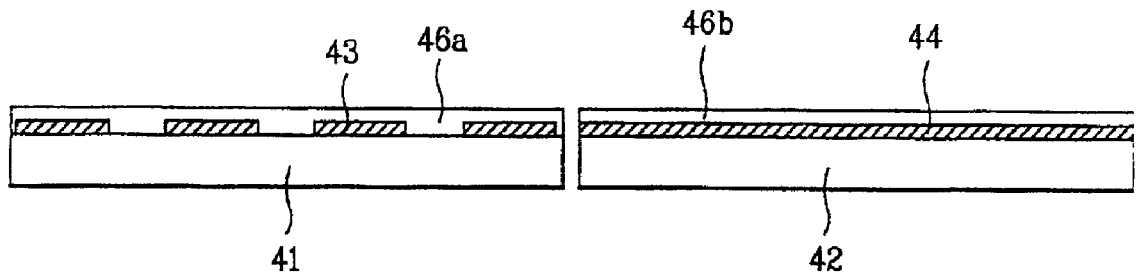
FIGS. 4A to 4D illustrate a process of fabricating a smectic LCD according to a second embodiment of the present invention.
Figure 4B:
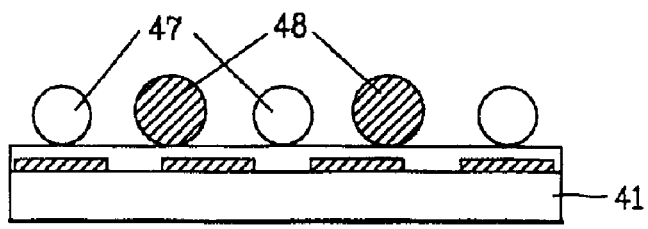

The LCD formed as above is also shock resistant due to absorption of external shocks by the patterned spacers and the oriented films Second Embodiment The method for fabricating a smectic LCD according to a second embodiment of the present invention includes producing crossing gate and data lines on a first substrate 41, reference FIG. 4A. Thin film transistors are formed near the crossings. Each thin film transistor includes a gate electrode, a gate insulating film, a semiconductor layer, a source electrode, and a drain electrode.

A protective film is then formed over the exposed surfaces, including over the thin film transistors. Pixel electrodes 43 that electrically connect to the drain electrodes of the thin film transistor are then formed on the protective film.

A black matrix is formed on a second substrate 42. The black matrix enhances the contrast ratio and prevents light leakage around the gate and drain lines and the thin film transistors. Color filters are formed in openings of the black matrix. A common electrode 44 that will face the pixel electrode 43 is then integrally formed over the exposed surfaces of the second substrate, including over the color filters.

A light oriented material is then coated and calcinated on the first and second substrates 41, 42, so as to form a first oriented film 46a and the second oriented film 46b.

Ball spacers 47 are then evenly dispersed on the first oriented film 46A. Additionally, photo cross-linkable adhesive spacers 48 are also evenly dispersed on the first oriented film 46A. The ball spacers maintain a predetermined spacing between the first substrate 41 and the second substrate 42, while the adhesive spacers 48 bond the first substrate 41 and the second substrate 42 together, as well as absorbing external shocks.

Figure 4C:
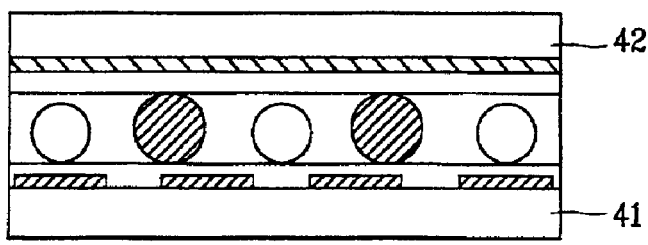
Figure 4D:
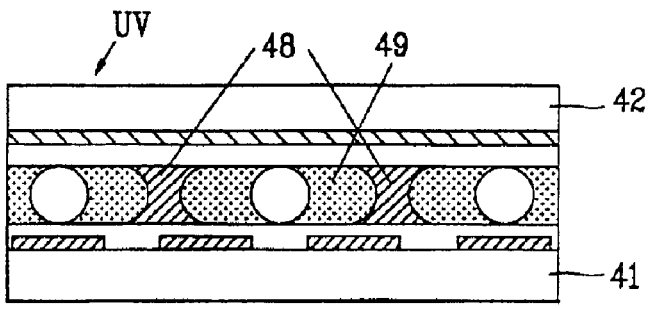

The first substrate 41 and the second substrate 42 are then disposed so as to face each other, reference FIG. 4C. UV light is then radiated onto and through the disposed substrates. The oriented films undergo an orientation treatment, and the first substrate 41 and the second substrate 42 are bonded by calcinating the photo cross-linkable adhesive spacers 48. The substrates are bonded together under an applied pressure while being irradiated with light.

A liquid crystal 49 is then injected between the two substrates. The LCD is completed by sealing the liquid crystal inlet. The liquid crystal is not limited to a smectic liquid crystal.

Available agents for optical orientation treatment according to the present invention include those with polyvinyl-cinnamate lineage, polyazobenzene lineage, cellulose-cinnamate lineage and photosensitive polyimide lineage (but are not limited thereto).

As described above, the method for fabricating a smectic LCD according to the present invention has the following advantages. First, the fabricating process is simplified by unifying the orientation treatment and the bonding process. Second, by employing light radiation for orientation treatment the faults caused by rubbing are prevented, improving the yield rate. Third, using an agent for orientation treatment and photo cross-linkable adhesive spacers enhances the shock resistance of the LCD and eliminates unstable orientations of the liquid crystal caused by external shocks.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for fabricating a liquid crystal display (LCD), comprising:
    forming a first substrate and a second substrate;
    forming patterned spacers on the first substrate;
    forming oriented films on the first substrate and on the second substrate;
    disposing the first substrate and the second substrate in a facing relationship wherein the oriented films on the first substrate and on the second substrate contact each other;
    radiating light on the oriented films on the first substrate and on the second substrate to orient and bond the oriented films to each other, whereby the first substrate and the second substrate are bonded together; and
    interposing a liquid crystal between the first substrate and the second substrate.

2. The method of claim 1, wherein the liquid crystal is a smectic liquid crystal.

3. The method of claim 1, wherein the radiated light is linearly polarized light.

4. The method of claim 1, wherein the radiated light is elliptically polarized light.

5. The method of claim 1, wherein the radiated light is UV light.

6. The method of claim 1, wherein the bond of the substrates includes pressing the first substrate and the second substrate together.

7. The method of claim 1, wherein forming a first substrate includes:
    forming a plurality of crossing gate lines and data lines on the first substrate;
    forming thin film transistors at each crossing; and
    forming pixel electrodes that electrically connect to the thin film transistors.

8. The method of claim 1, wherein the patterned spacers are formed between the pixel electrodes.

9. A method for fabricating an LCD, comprising:
    forming a first substrate and a second substrate;
    forming a first oriented film on the first substrate and a second oriented film on the second substrate;
    locating spacers on the first substrate;
    disposing the first substrate and the second substrate in a facing relationship such that the spacers form a gap between the first substrate and the second substrate;
    radiating light on the first oriented film and on the second oriented film to orient and bond the first and second oriented films to each other, whereby the first substrate and the second substrate are bonded together; and
    interposing a liquid crystal between the first substrate and the second substrate.

10. The method of claim 9, wherein the spacers include photo cross-linkable adhesive spacers and ball spacers.

11. The method of claim 9, wherein the liquid crystal is a smectic liquid crystal.

12. The method of claim 9, wherein the first substrate and the second substrate are pressed together during the radiating light.

13. The method of claim 9, wherein the radiating light is lineally polarized light or elliptically polarized light.

14. A method for fabricating a liquid crystal display, comprising:
    forming a first substrate and a second substrate;
    forming oriented films on the first substrate and on the second substrate;
    disposing the first substrate and the second substrate in a facing relationship;
    radiating light on the oriented films to orient and bond the oriented films to each other, whereby the first substrate and the second substrate are bonded together; and
    interposing a liquid crystal between the first substrate and the second substrate.

15. The method of claim 14, further including locating spacers on the first substrate.

16. The method of claim 15, wherein the spacers are located by depositing and then patterning a spacer material.

17. The method of claim 15, wherein the spacers are located by dispersing photo cross-linkable adhesive spacers on the first substrate.

18. The method of claim 17, wherein the spacers are located by dispersing ball spacers on the first substrate between the photo cross-linkable adhesive spacers.

19. The method of claim 14, wherein the radiating light is performed using linearly polarized light.

20. The method of claim 14, wherein the radiating light is performed using elliptically polarized light.

21. A liquid crystal display, comprising:
a first substrate having patterned spacers;
a first oriented film, comprised of a light reactive material, over the first substrate and over its patterned spacers, wherein the first oriented film forms a first alignment film;
a second substrate;
a second oriented film, comprised of a light reactive material, over the second substrate, wherein the second oriented film forms a second alignment film; and
a liquid crystal,
wherein the first substrate and the second substrate are configured in a facing relationship such that the first alignment film on the patterned spacers contacts the second alignment film, wherein a radiating light on the contacting alignment films orients and bonds the first and second alignment films to each other, whereby the first substrate and the second substrate are bonded together, wherein a gap exists between portions of the first substrate and portions of the second substrate, and wherein the liquid crystal is disposed in the gap.

22. The liquid crystal display of claim 21 wherein the liquid crystal is a smectic liquid crystal.

23. The liquid crystal display of claim 21, wherein the light reactive materials of the first substrate and the second substrate react to linearly polarized light.

24. The liquid crystal display of claim 21, wherein the light reactive materials of the first substrate and the second substrate react to elliptically polarized light.

25. The liquid crystal display of claim 21, wherein the light reactive materials of the first substrate and the second substrate react to UV light.

26. The liquid crystal display of claim 21, wherein the light reactive materials on the first substrate and on the second substrate are selected from a group consisting of materials with a polyvinylcinnamate lineage, a polyazobenzene lineage, a cellulosecinnamate lineage and a photosensitive polyimide lineage.

27. The liquid crystal display of claim 21, wherein the patterned spacers are located between pixel electrodes.

28. A liquid crystal display, comprising:
a first substrate;
a first oriented film, comprised of a light reactive material, over the first substrate, wherein the first oriented film forms a first alignment film;
a plurality of spacers on the first substrate;
a second substrate configured over the plurality of spacers such that the second substrate is disposed away from the first substrate;
a second oriented film, comprised of a light reactive material, on the second substrate and disposed between the first substrate and the second substrate and in contact with the plurality of spacers, wherein the second oriented film forms a second alignment film; and
a liquid crystal between the first substrate and the second substrate,
wherein the first alignment film contacts the second alignment film such that a radiating light on the contacting films orients and bonds the first and second alignment films to each other, whereby the first substrate and second substrate are bonded together.

29. The liquid crystal display of claim 28, wherein the plurality of spacers include photo cross-linkable adhesive spacers that bond the first substrate to the second substrate.

30. The liquid crystal display of claim 28, wherein the plurality of spacers include ball spacers.

31. The method of claim 28, wherein the liquid crystal is a smectic liquid crystal.

32. The liquid crystal display of claim 28, wherein the light reactive materials of the first substrate and the second substrate react to linearly polarized light.

33. The liquid crystal display of claim 28, wherein the light reactive materials of the first substrate and the second substrate react to elliptically polarized light.

34. The liquid crystal display of claim 28, wherein the light reactive materials of the first substrate and the second substrate react to UV light.

35. The liquid crystal display of claim 28, wherein the light reactive materials of the first substrate and the second substrate are selected from a group consisting of materials with a polyvinylcinnamate lineage, a polyazobenzene lineage, a cellulosecinnamate lineage and a photosensitive polyimide lineage.

* * * * *